United States Patent
Chen et al.

(10) Patent No.: US 11,913,128 B2
(45) Date of Patent: Feb. 27, 2024

(54) COMPACT AND FLAT BISMUTH METAL PREPARATION BY ELECTROLYSIS METHOD

(71) Applicant: Central South University, Changsha (CN)

(72) Inventors: Yongming Chen, Changsha (CN); Shanshan Liu, Shiyan (CN); Henghui Wang, Changsha (CN); Shenghai Yang, Changsha (CN); Cong Chang, Changzhi (CN); Changliu Xiang, Huaihua (CN); Changhong Wang, Changsha (CN); Tao Luo, Changsha (CN); Jie Dai, Xinyang (CN)

(73) Assignee: CENTRAL SOUTH UNIVERSITY, Changsha (CN)

(*) Notice: Subject to any disclaimer, the term of this patent is extended or adjusted under 35 U.S.C. 154(b) by 0 days.

(21) Appl. No.: 17/568,889

(22) Filed: Jan. 5, 2022

(65) Prior Publication Data
US 2022/0380921 A1 Dec. 1, 2022

(30) Foreign Application Priority Data

May 28, 2021 (CN) .......................... 202110606523.0

(51) Int. Cl.
C25D 3/54 (2006.01)
C25D 1/04 (2006.01)

(52) U.S. Cl.
CPC .... *C25D 1/04* (2013.01); *C25D 3/54* (2013.01)

(58) Field of Classification Search
None
See application file for complete search history.

(56) References Cited

U.S. PATENT DOCUMENTS

2003/0102226 A1 6/2003 Gabe et al.
2017/0067174 A1* 3/2017 Foyet .................. C25D 7/10

FOREIGN PATENT DOCUMENTS

| CN | 102618883 A | 8/2012 |
| CN | 110578153 A | 12/2019 |
| DE | 102005016819 A | 10/2006 |
| EP | 0255558 * | 2/1988 ............... C25D 3/54 |

OTHER PUBLICATIONS

English translation CN 112522766. (Year: 2021).*
English translation CN 112176383. (Year: 2021).*
English translation CN 105648489. (Year: 2016).*
Electrochemical Teaching and Research Office of the Department of Chemical Engineering, Tianjin University; electroplate; 1974; 146-147; Tianjin People's Publishing House.

* cited by examiner

*Primary Examiner* — Stefanie S Wittenberg
(74) *Attorney, Agent, or Firm* — WPAT, PC

(57) ABSTRACT

A method for compact and flat bismuth metal preparation by electrolysis is provided. In the method, one or more of β-naphthol, acacia, sulfonated and vulcanized alkylphenol ethoxylate and naphthol ethoxylate oxides are added to the acidic solution of bismuth methanesulfonate as additives, and the cathodic bismuth is obtained by electrolysis at 20-80° C. The method for bismuth metal preparation is simple and easy to promote, environment-friendly, and the obtained bismuth metal has a flat and compact surface and good plate formation effect.

8 Claims, 12 Drawing Sheets

COMPACT AND FLAT BISMUTH METAL PREPARATION BY ELECTROLYSIS METHOD

TECHNICAL FIELD

The disclosure relates to the technical field of non-ferrous metal hydrometallurgy, in particular to compact and flat bismuth metal preparation by electrolysis method.

BACKGROUND

Bismuth is an important raw material widely used in the semiconductor industry, which is usually enriched in intermediate products or by-products such as copper-lead-tin anodic mud and smelting dust. At present, bismuth hydrometallurgical extraction is only used as a pretreatment method in the recovery of complex bismuth-containing materials, which has the advantages of a high comprehensive recovery rate of valuable metals, good adaptability of raw materials and flexible product schemes. However, the conventional bismuth hydrometallurgical system mostly adopts chloride, hydrochloric acid, nitric acid or silicofluoric acid system, which usually includes leaching, purification, preparation of bismuth (iron powder replacement, neutralization hydrolysis precipitation, diaphragm electrodeposition) and other processes. There are many disadvantages, such as poor stability of leaching reagent, strong volatility and poor working environment. At the same time, it is difficult to control the morphology of bismuth produced by diaphragm electrodeposition in chloride and hydrochloric acid system, and it is easy to form dendrites and burrs, which leads to short circuit in the electrodeposition process. With the requirements of green and low-carbon era, it is of great significance to develop a new environment-friendly bismuth hydrometallurgy process.

With the advantages of good thermal stability, low volatility, high metal solubility and conductivity, and biodegradability, methanesulfonic acid has been applied widely in the fields of electroplating, industrial cleaning, and chemical synthesis. Chinese Patent Application No. 201910831284.1 (corresponding to Chinese patent publication No. 110578153A) adopts bismuth methanesulfonate-methanesulfonic acid solution instead of bismuth fluorosilicate-fluorosilicic acid and bismuth chloride-hydrochloric acid solution as electrolyte for crude bismuth refining, and selects one or any one of animal glue, polyethylene glycol, polypropylene glycol, lignosulfonate, sodium dodecyl sulfate as additive, which provides a crude bismuth electrolytic refining solution system with significant environmental benefits and high current efficiency. However, it is not clear for the effect of different additive on the morphology and mechanism of cathodic bismuth. Thus, a method of electrolytic preparation of compact and flat bismuth metal through screening and matching of additive plays an important role in the development of bismuth hydrometallurgy extraction process with methanesulfonic acid system.

SUMMARY

The disclosure provides a method for compact and flat bismuth metal preparation by electrolysis which can significantly improve the density and flatness of the obtained bismuth metal with good plate forming effect.

In order to achieve the above purpose, the disclosure adopts the following technical schemes:

Compact and flat bismuth metal preparation by electrolysis method, with the following preparation steps:

1) preparing an acidic solution of bismuth methanesulfonate as an electrolyte, and adding additive to the electrolyte to obtain a mixed electrolyte;

2) injecting the mixed electrolyte obtained in step 1) into an electrolytic cell, inserting an anodic plate and a cathodic plate, and applying direct current electrolysis to obtain compact and flat bismuth metal.

Preferably, the additive is one or more of β-naphthol, acacia, sulfonated and vulcanized alkylphenol ethoxy and naphthol ethoxy oxide.

Preferably, the concentration of the additive is 0.2-2.0 g/L.

Preferably, the acidic solution of bismuth methanesulfonate consists of bismuth methanesulfonate and free methanesulfonic acid, and the concentration of the free methanesulfonic acid is 50-100 g/L.

Preferably, the concentration of bismuth ions in the electrolyte is 50-120 g/L.

Preferably, the cathodic plate is a titanium plate, the anodic plate is a graphite plate, and the polar distance between the anode and the cathode is 3-5 cm.

Preferably, the temperature of the electrolyte is controlled at 20-80° C. during electrolysis.

Preferably, the cathodic current density of electrolysis is 60-300 A/m².

Preferably, the electrolysis duration is 4-72 h.

Preferably, the electrolyte circulates in the way of down-in-up-out or up-in-down-out.

Preferably, the bismuth prepared by the method can be cast into bismuth ingots after final refining.

The electrode reaction in electrolysis is as follows:

$$\text{Cathode: } Bi^{3+} + 3e^- = Bi \quad (1);$$

$$\text{Anode: } 2H_2O - 4e^- = O_2(\uparrow) + 4H^+ \quad (2).$$

It can be seen from the above technical scheme that compared with the prior art, the disclosure has the following beneficial effects:

The disclosure adopts methanesulfonic acid system to replace the chlorine, hydrochloric acid, nitric acid and silicofluoric acid system used in the traditional bismuth hydrometallurgical extraction, which has the advantages of high solubility of bismuth, good stability, low volatilization rate and environmental protection and energy conservation. In the process of bismuth electrolysis, any one or more mixtures of β-naphthol, acacia, sulfonated and vulcanized alkylphenol ethoxy and naphthol ethoxy oxide are selected as the additive to obtain bismuth metal with purity above 99.9% with compact and flat surface, no burr around and good plate formation.

BRIEF DESCRIPTION OF THE DRAWINGS

In order to more clearly explain the embodiments of the disclosure or the technical schemes in the prior art, a brief introduction to the drawings needed in the embodiments or existing technical description is given below. Obviously, the drawings in the following description are only the embodiments of the disclosure, and for those of ordinary skill in the art, other drawings can be obtained without creative efforts according to the provided drawings.

DETAILED DESCRIPTION OF THE EMBODIMENTS

Figure 1A:
FIG. 1A through FIG. 1C show a bismuth metal prepared in a first embodiment and SEM (Scanning Electron Microscopy) images corresponding thereto.

The disclosure provides a method for compact and flat bismuth metal preparation by electrolysis, including the following specific operation steps:
1) preparing an acidic solution of bismuth methanesulfonate as an electrolyte, and adding additives to the electrolyte to obtain a mixed electrolyte;
2) injecting the mixed electrolyte obtained in step 1) into an electrolytic cell, inserting an anodic plate and a cathodic plate, and applying direct current electrolysis to obtain compact and flat bismuth metal.

In an embodiment, the additive is preferably one or more of β-naphthol, acacia, sulfonated and vulcanized alkylphenol ethoxy and naphthol ethoxy oxide, and further preferably a mixture of sulfonated and vulcanized alkylphenol ethoxy and naphthol ethoxy oxide.

In an embodiment, the concentration of the additive is 0.2-2.0 g/L, preferably 0.5-1.5 g/L, more preferably 0.7-0.9 g/L.

In an embodiment, the additive is most preferably a mixture of 0.75 g/L sulfonated and vulcanized alkylphenol ethoxy and 0.1 g/L naphthol ethoxy oxide.

In an embodiment, the acidic solution of bismuth methanesulfonate consists of bismuth methanesulfonate and free methanesulfonic acid, and the concentration of free methanesulfonic acid is 50-100 g/L, preferably 50-80 g/L, more preferably 50 g/L.

In an embodiment, the concentration of bismuth ions in the electrolyte is 50-120 g/L, preferably 80-100 g/L, more preferably 90 g/L.

In an embodiment, the cathodic plate is a titanium plate, the anodic plate is a graphite plate, and the polar distance between the anode and the cathode is preferably 3-5 cm, more preferably 4 cm.

In an embodiment, the temperature of the electrolyte during electrolysis is controlled to be 20-80° C., preferably 20-40° C., more preferably 35° C.

In an embodiment, the cathodic current density of electrolysis is 60-300 A/m$^2$, preferably 150-300 A/m$^2$, more preferably 210 A/m$^2$.

In an embodiment, the electrolysis duration is 4-72 h, preferably 8-16 h, more preferably 12 h.

In an embodiment, the electrolyte circulates in the way of down-in-up-out or up-in-down-out.

The technical schemes in the embodiments of the disclosure will be described clearly and completely below, and it is obvious that the described embodiments are only a part of the embodiments of the disclosure, and not all of them. Based on the embodiments in the disclosure, all other embodiments obtained by ordinary technicians in the field without making creative labor fall within the scope of protection of the disclosure.

First Embodiment

Figure 1B:
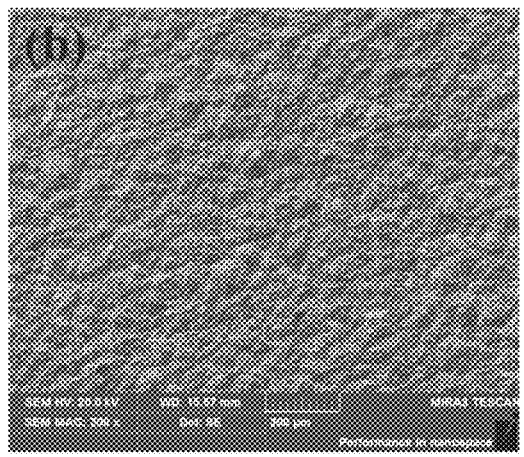
Figure 1C:
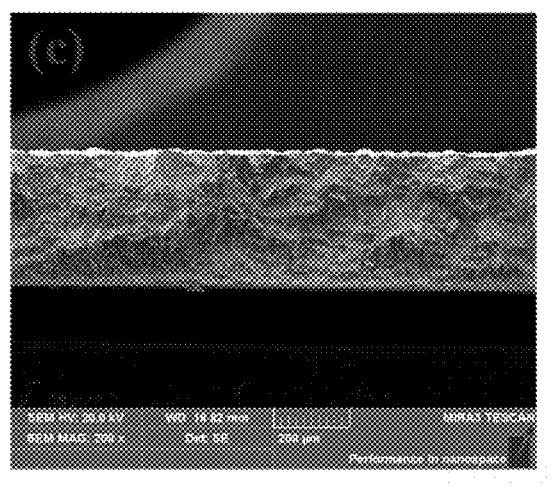
Figure 12:
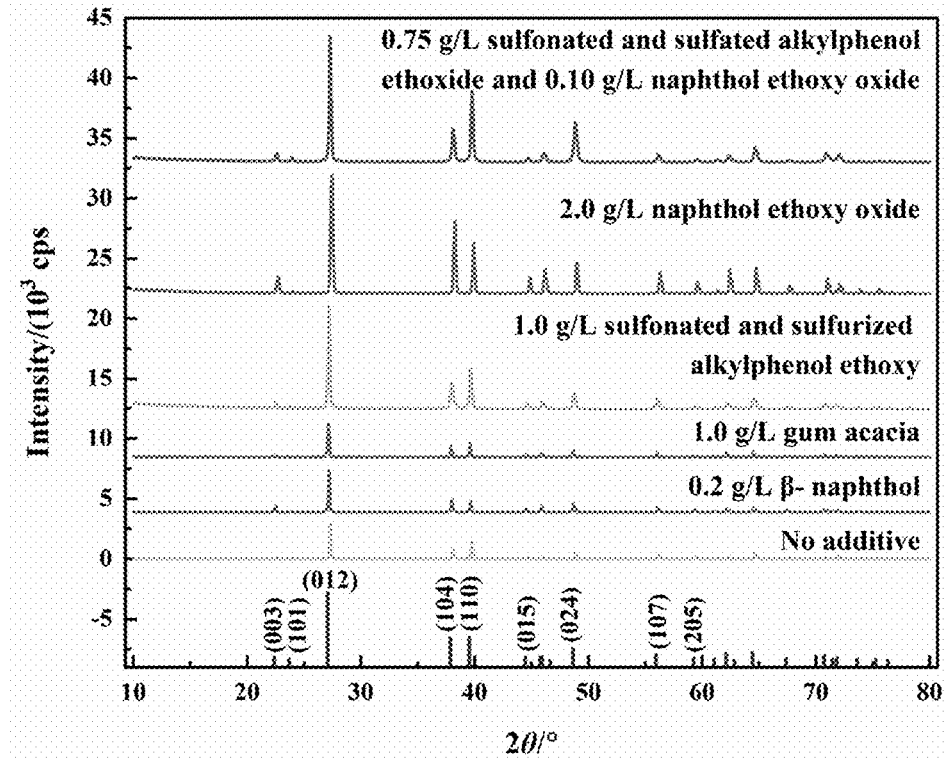
FIG. 12 shows XRD (X-ray Diffraction) diagrams of the respective bismuth metals prepared by the first embodiment to the fifth embodiment.

Bismuth methanesulfonate acidic solution is prepared as the electrolyte, in which the concentration of bismuth ion is 100 g/L and the concentration of free methanesulfonic acid is 90 g/L. 0.2 g/L β-naphthol is added to the electrolyte as an additive. The electrolyte is injected into the electrolytic cell and circulated in the way of down-in-up-out, and the temperature of the electrolyte is controlled at 50° C. The graphite plate is used as the anode and the titanium plate is used as the cathode, and the polar distance between cathode and anode is controlled to be 4 cm. The electrolysis is applied with direct current for 24 h at a cathodic current density of 200 A/m$^2$ to obtain compact and flat bismuth metal with no burr around and good plate formation, as shown in the attached FIG. 1A, the surface SEM image is shown in FIG. 1B, and the cross-section SEM image is shown in FIG. 1C (the scale of all SEM images in this disclosure is 200 μm), and the XRD diagram is shown in FIG. 12. In this embodiment, the cell voltage is 1.72 V, the current efficiency is 99.42%, and the DC energy consumption is 665.65 kw·h/t Bi.

Second Embodiment

Figure 2A:
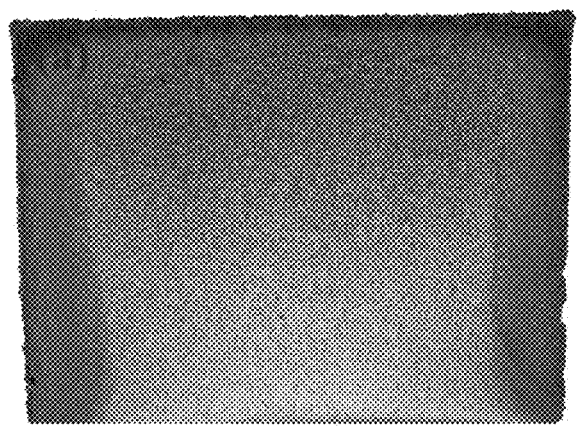
FIG. 2A through FIG. 2C show a bismuth metal prepared in a second embodiment and SEM images corresponding thereto.
Figure 2B:
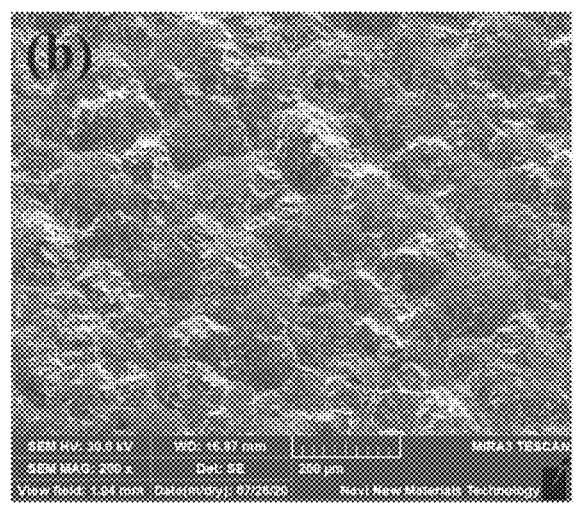
Figure 2C:
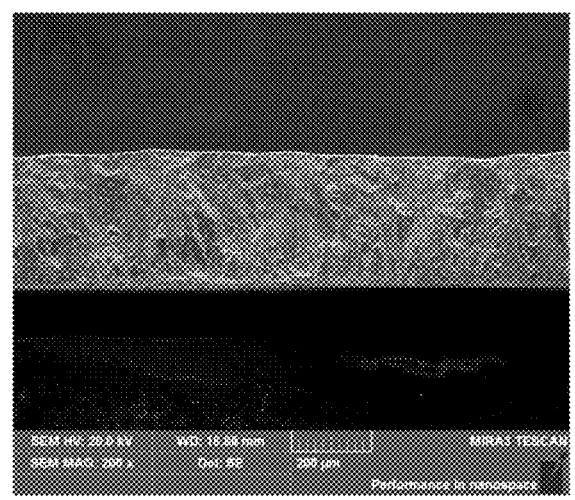

Bismuth methanesulfonate acidic solution is prepared as the electrolyte, in which the concentration of bismuth ion is 90 g/L and the concentration of free methanesulfonic acid is 80 g/L. 1 g/L acacia is added to the electrolyte as an additive. The electrolyte is injected into the electrolytic cell and circulated in the way of down-in-up-out, and the temperature of the electrolyte is controlled at 20° C. The graphite plate is used as the anode and the titanium plate as the cathode, and the polar distance between cathode and anode is controlled to be 3 cm. The electrolysis is applied with direct current for 36 h at a cathodic current density of 60 A/m$^2$ to obtain compact and flat bismuth metal with no burr around and good plate formation, as shown in FIG. 2A, the surface SEM image as shown in FIG. 2B, the cross-section SEM image as shown in FIG. 2C, and the XRD diagram as shown in FIG. 12. In this embodiment, the cell voltage is 1.74 V, the current efficiency is 98.62%, the DC energy consumption is 679.50 kw·h/t Bi.

Third Embodiment

Figure 3A:
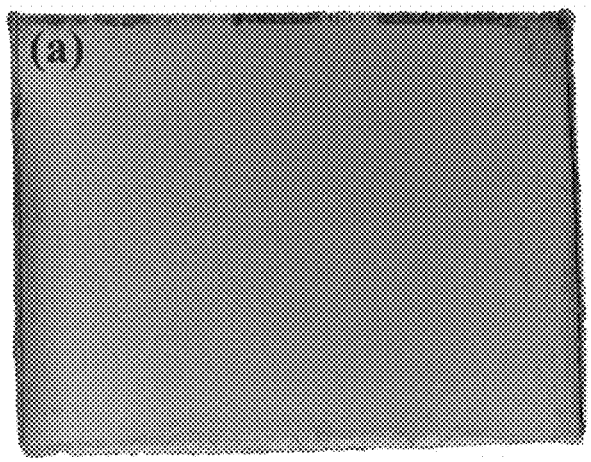
FIG. 3A through FIG. 3C show a bismuth metal prepared in a third embodiment and SEM images corresponding thereto.
Figure 3B:
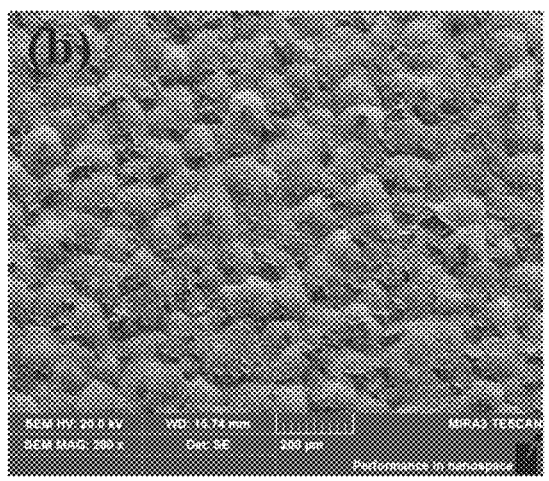
Figure 3C:
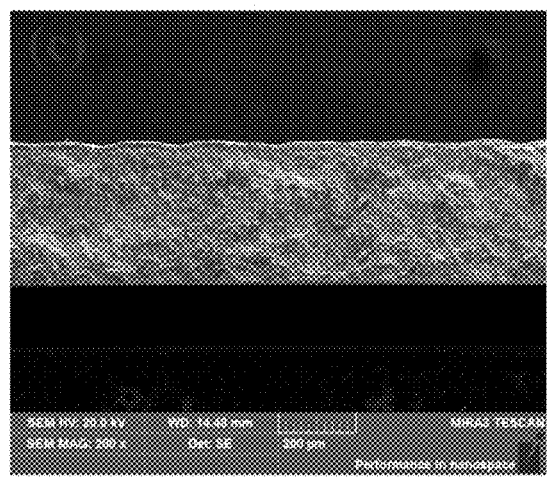

Bismuth methanesulfonate acid solution is prepared as the electrolyte, in which the concentration of the bismuth ion is 50 g/L and the concentration of the free methanesulfonic acid is 50 g/L. 1.0 g/L sulfonated and vulcanized alkylphenol ethoxy is added to the electrolyte as an additive. The electrolyte is injected into the electrolytic cell and circulated in the way of up-in-down-out, and the temperature of the electrolyte is controlled at 60° C. The graphite plate is used as the anode and the titanium plate as the cathode, and the polar distance between cathode and anode is controlled to be 5 cm. The electrolysis is applied with direct current for 4 h at a cathodic current density of 160 A/m$^2$ to obtain compact and flat bismuth metal with no burr around and good plate formation, as shown in FIG. 3A, the surface SEM image is shown in FIG. 3B, the cross-section SEM image is shown in FIG. 3C, and the XRD diagram is shown in FIG. 12. In this implementation, the cell voltage is 1.82 V, the current efficiency is 99.83%, and the DC energy consumption is 701.45 kW·h/t Bi.

Fourth Embodiment

Figure 4A:
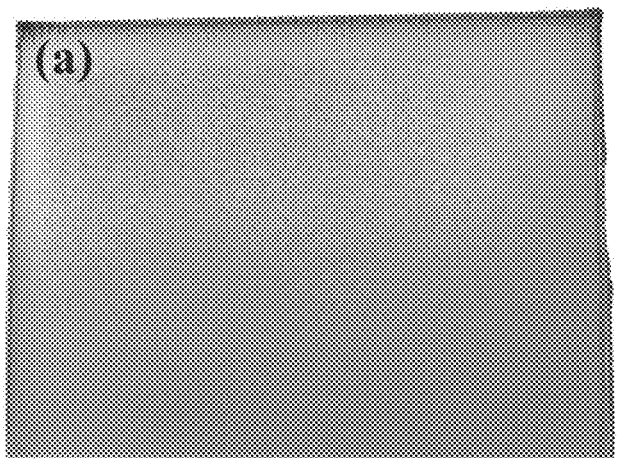
FIG. 4A through FIG. 4C show a bismuth metal prepared in a fourth embodiment and SEM images corresponding thereto.
Figure 4B:
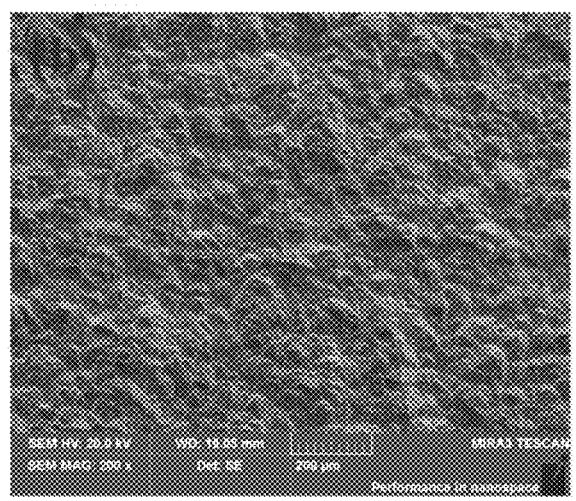
Figure 4C:
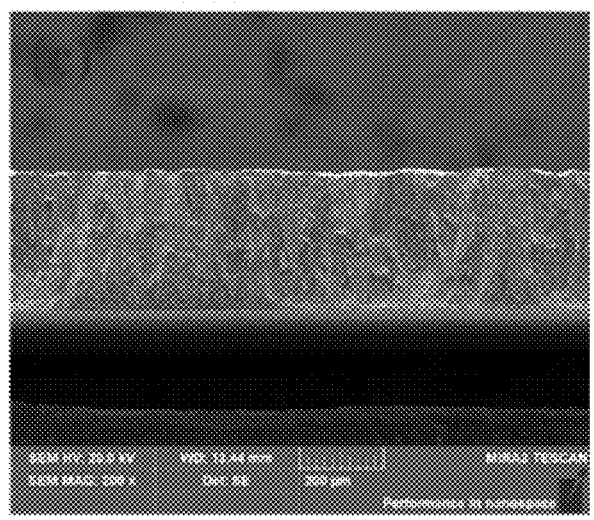

Bismuth methanesulfonate acidic solution is prepared as the electrolyte, in which the concentration of bismuth ion is 120 g/L and the concentration of free methanesulfonic acid is 100 g/L. 2 g/L naphthol ethoxy oxide is added to the electrolyte as an additive. The electrolyte is injected into the electrolytic cell and circulated in the way of down-in-up-out, and the temperature of the electrolyte is controlled at 80° C. The graphite plate is used as the anode and the titanium plate as the cathode, and the polar distance between cathode and anode is controlled to be 5 cm. The electrolysis is applied with direct current for 48 h at a cathodic current density of 300 A/m$^2$ to obtain compact and flat bismuth metal with no burr around and good plate formation, as shown in FIG. 4A, the surface SEM image is shown in FIG. 4B, the cross-section SEM image is shown in FIG. 4C, and the XRD diagram is shown in FIG. 12. In this embodiment, the cell voltage is 1.92 V, the current efficiency is 98.80%, and the DC energy consumption is 747.71 kw·h/t Bi.

Fifth Embodiment

Figure 5A:
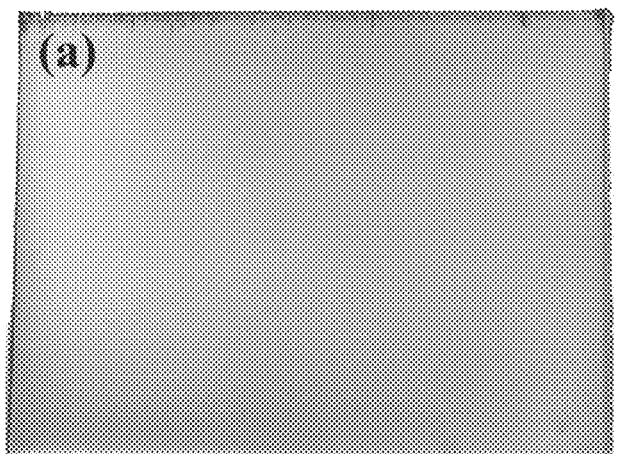
FIG. 5A through FIG. 5C show a bismuth metal prepared in a fifth embodiment and SEM images corresponding thereto.
Figure 5B:
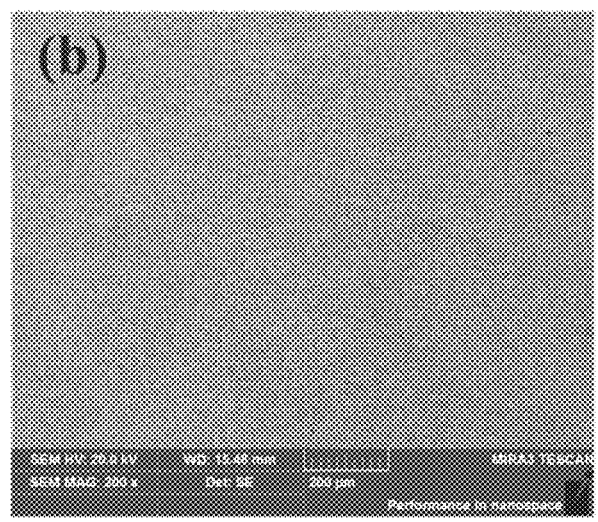
Figure 5C:
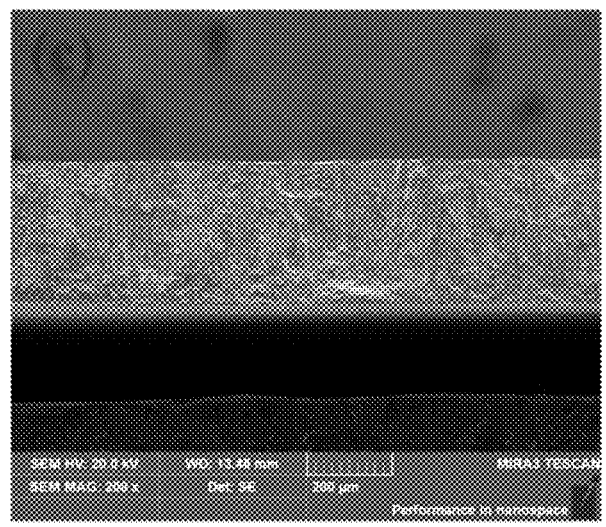

Bismuth methanesulfonate acidic solution is prepared as the electrolyte, in which the concentration of bismuth ion is 90 g/L and the concentration of free methanesulfonic acid is 50 g/L. 0.75 g/L sulfonated and vulcanized alkylphenol ethoxy and 0.10 g/L naphthol ethoxy oxide are added to the electrolyte as the additive. The electrolyte is injected into the electrolytic cell and circulated in the way of down-in-up-out, and the temperature of the electrolyte is controlled at 35° C. The graphite plate is used as the anode and the titanium plate as the cathode, and the polar distance between cathode and anode is controlled to be 4 cm. The electrolysis is applied with direct current for 12 h at a cathodic current density of 210 A/m$^2$ to obtain compact and flat bismuth metal with no burr around and good plate formation, as shown in FIG. 5A, the surface SEM image is shown in FIG. 5B, the cross-section SEM image is shown in FIG. 5C, and the XRD diagram is shown in FIG. 12. In this embodiment, the cell voltage is 1.88 V, the current efficiency is 99.14%, the DC energy consumption is 729.59 kw·h/t Bi.

Detection of the metal bismuth obtained from through first to fifth embodiments shows that the purity of the metal bismuth is above 99.9%.

First Comparative Embodiment

Figure 6A:
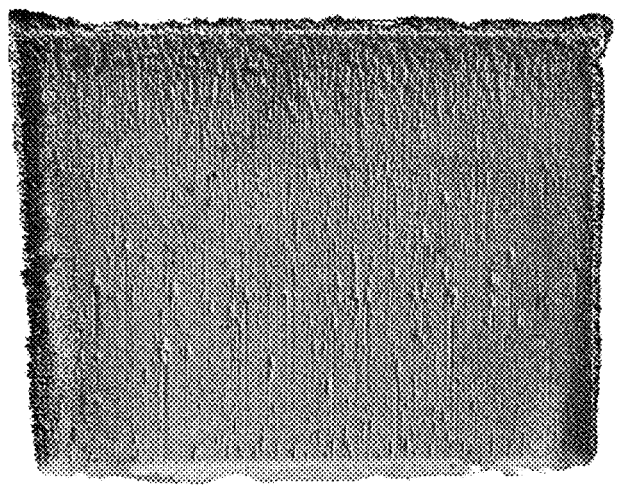
FIG. 6A through FIG. 6C show a bismuth metal prepared in a first comparative embodiment and SEM images corresponding thereto.
Figure 6B:
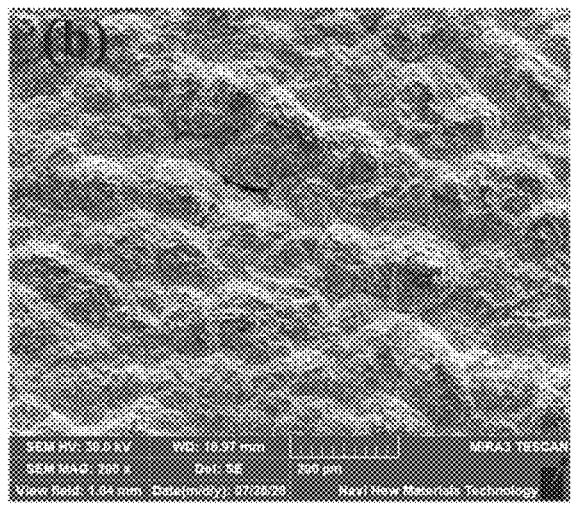
Figure 6C:
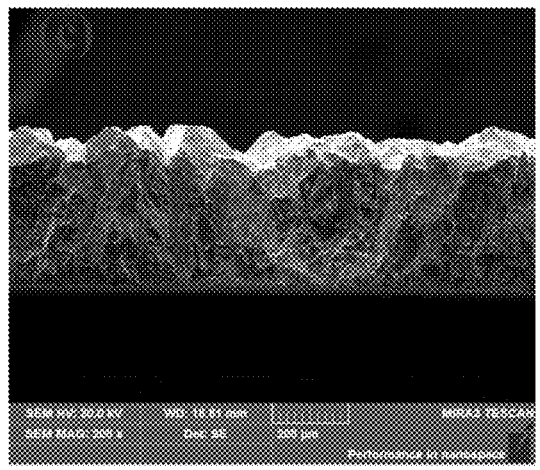
Figure 13:
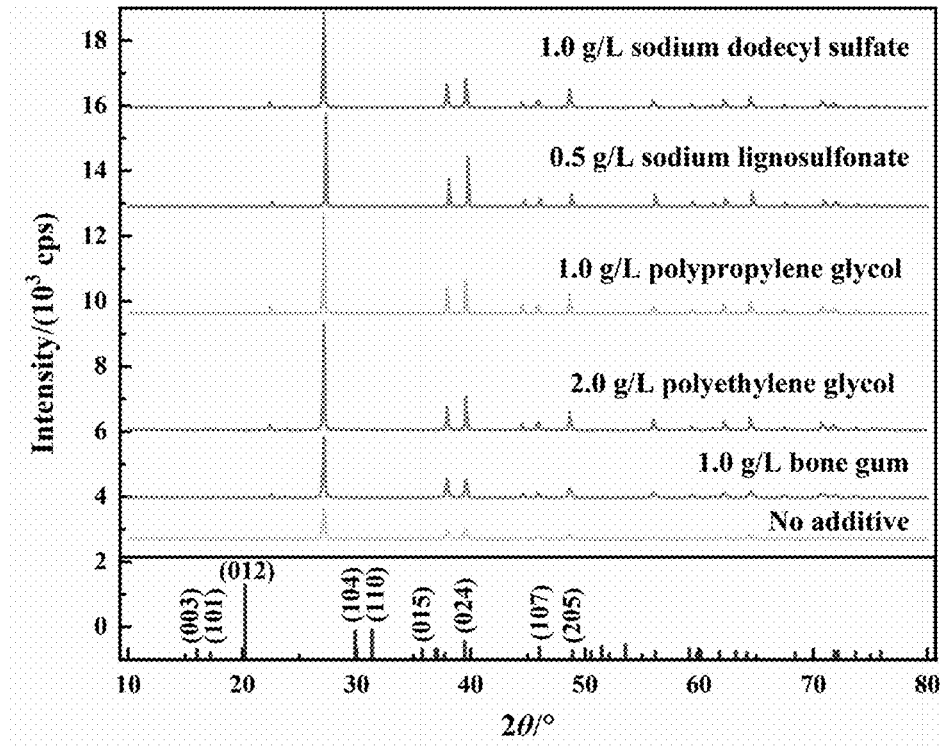
FIG. 13 shows XRD diagrams of the respective bismuth metals prepared by the first comparative embodiment to the sixth comparative embodiment.

Bismuth methanesulfonate acidic solution is prepared as the electrolyte, in which the concentration of bismuth ion is 90 g/L and the concentration of free methanesulfonic acid is 50 g/L. 1.0 g/L bone glue is added to the electrolyte as an additive (1.0 g/L bone glue, 2.0 g/L macrogol 600, 1.0 g/L polypropylene glycol 400, 0.5 g/L sodium lignosulfonate and 1.0 g/L sodium dodecyl sulfate). The electrolyte is injected into the electrolytic cell and circulated in the way of down-in-up-out, and the temperature of the electrolyte is controlled at 35° C. The graphite plate is used as the anode and titanium plate as the cathode, and the polar distance between cathode and anode is controlled to be 4 cm. The electrolysis is applied with direct current for 12 h at a cathodic current density of 210 A/m$^2$ to obtain compact and flat bismuth metal with no burr around and good plate formation, as shown in FIG. 6A, the surface SEM image is shown in FIG. 6B, the cross-section SEM image is shown in FIG. 6C, and the XRD diagram is shown in FIG. 13.

Figure 7A:
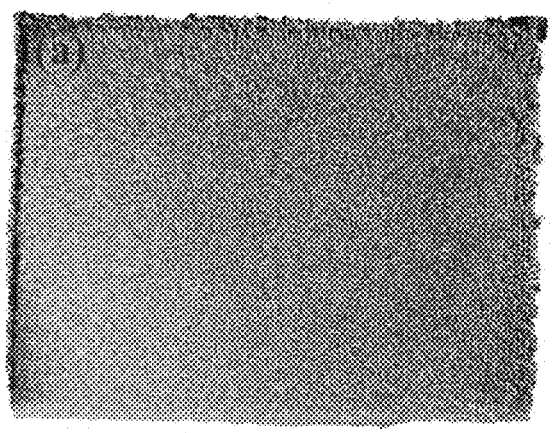
FIG. 7A through FIG. 7C show a bismuth metal prepared in a second comparative embodiment and SEM images corresponding thereto.
Figure 7B:
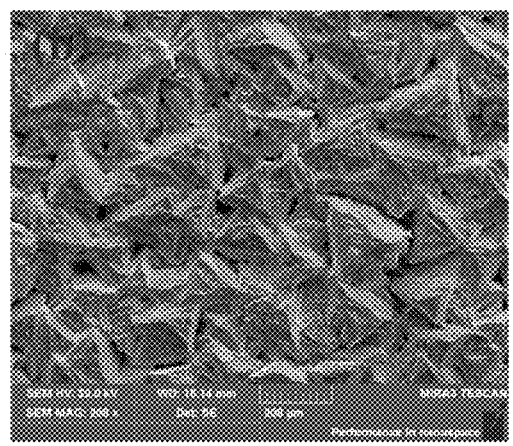
Figure 7C:
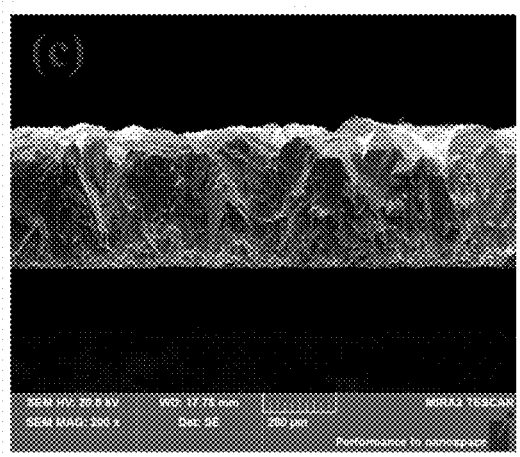

Second Comparative Embodiment 2.0 g/L macrogo 600 is added to the electrolyte as an additive, and the other conditions are the same as the first comparative embodiment. The obtained cathodic bismuth metal is shown in the attached FIG. 7A, the surface SEM image is shown in FIG. 7B, the cross-section SEM image is shown in FIG. 7C, and the XRD diagram is shown in FIG. 13.

Figure 8A:
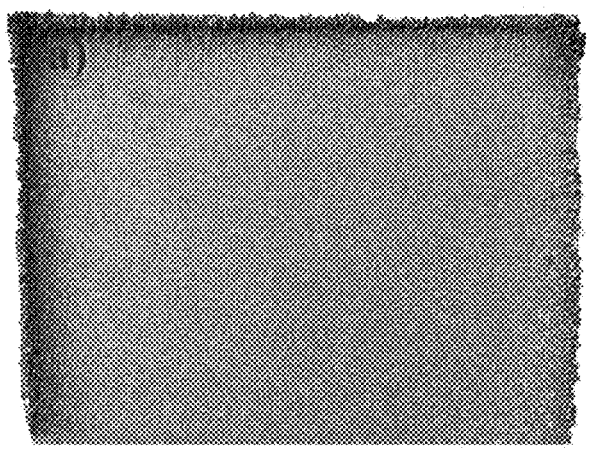
FIG. 8A through FIG. 8C show a bismuth metal prepared in a third comparative embodiment and SEM images corresponding thereto.
Figure 8B:
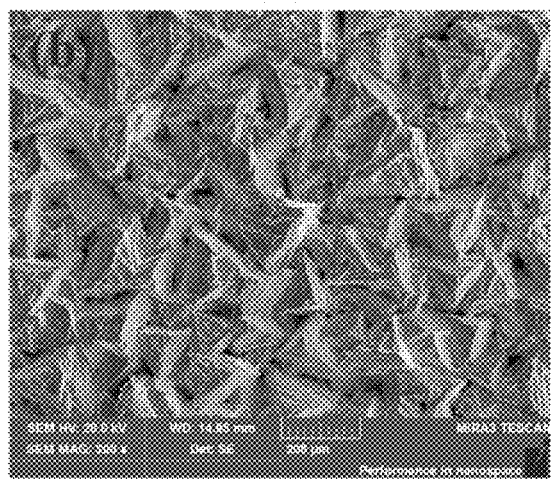
Figure 8C:
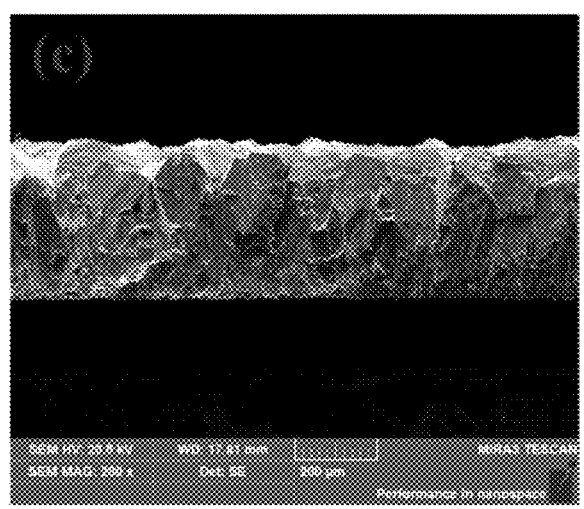

Third Comparative Embodiment 1.0 g/L polypropylene glycol 400 is added to the electrolyte as an additive, and the other conditions are the same as the first comparative embodiment. The obtained cathodic bismuth metal is shown in FIG. 8A, the surface SEM image is shown in FIG. 8B, the cross-section SEM image is shown in FIG. 8C, and the XRD diagram is shown in FIG. 13.

Figure 9A:
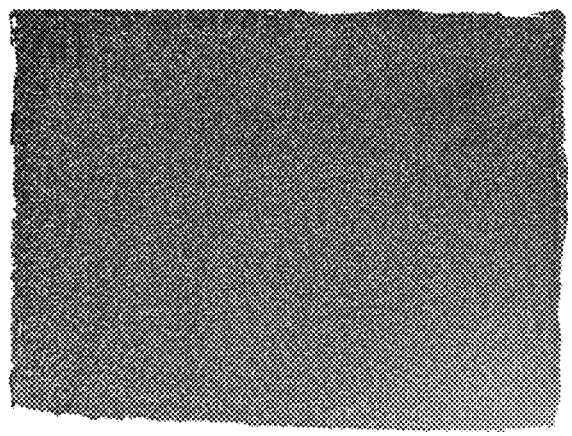
FIG. 9A through FIG. 9C show a bismuth metal prepared in a fourth comparative embodiment and SEM images corresponding thereto.
Figure 9B:
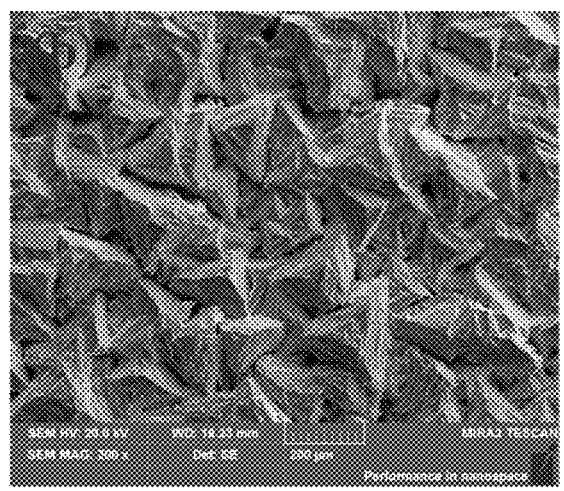
Figure 9C:
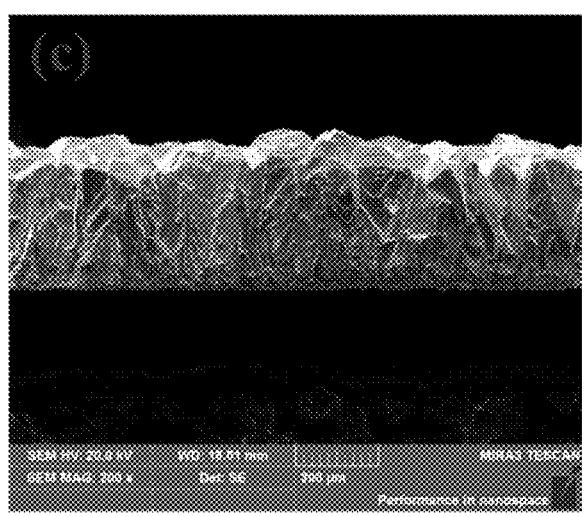

Fourth Comparative Embodiment 0.5 g/L sodium lignin sulfonate is added to the electrolyte as an additive, and the other conditions are the same as the first comparative embodiment. The obtained cathodic bismuth metal is shown in the attached FIG. 9A, the surface SEM image is shown in FIG. 9B, the cross-section SEM image is shown in FIG. 9C, and the XRD diagram is shown in FIG. 13.

Figure 10A:
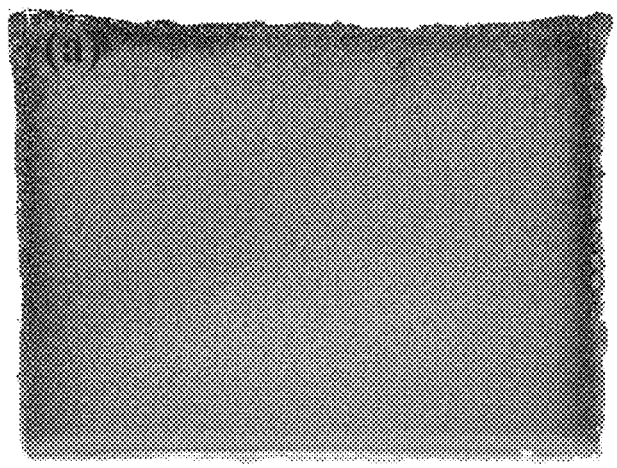
FIG. 10A through FIG. 10C show a bismuth metal prepared in a fifth comparative embodiment and SEM images corresponding thereto.
Figure 10B:
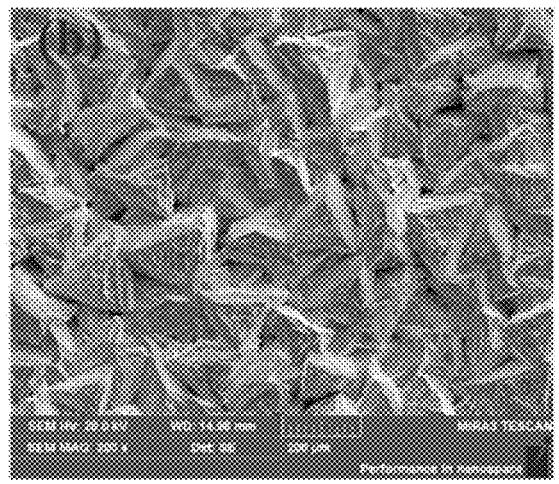
Figure 10C:
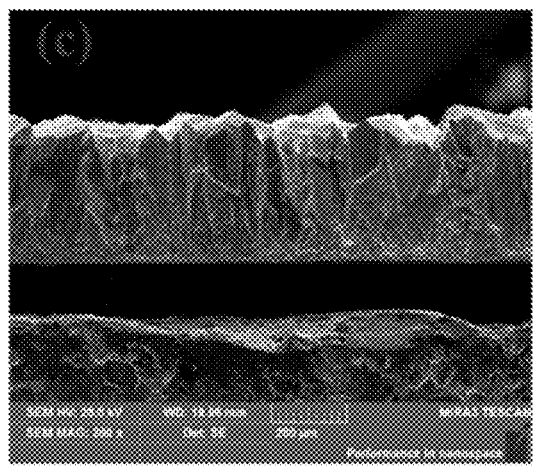

Fifth Comparative Embodiment 1.0 g/L sodium dodecyl sulfate is added to the electrolyte as an additive, and the other conditions are the same as the first comparative embodiment. The obtained cathodic bismuth metal is shown in FIG. 10A, the surface SEM image is shown in FIG. 10B, the cross-section SEM image is shown in FIG. 10C, and the XRD diagram is shown in FIG. 13.

Sixth Comparative Embodiment

Figure 11A:
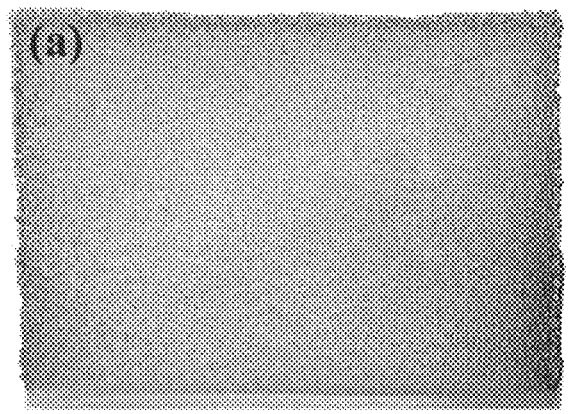
FIG. 11A through FIG. 11C show a bismuth metal prepared in a sixth comparative embodiment and SEM images corresponding thereto.
Figure 11B:
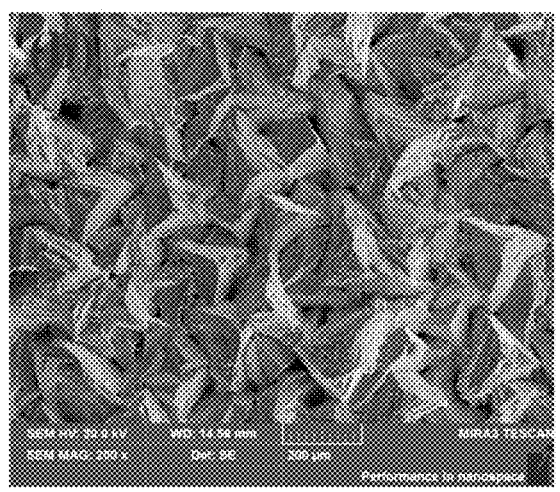
Figure 11C:
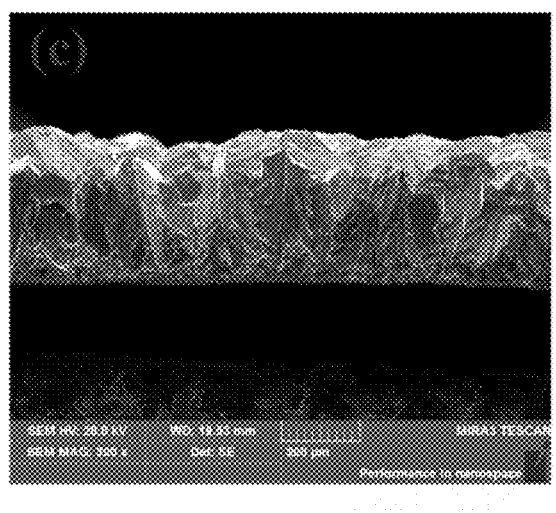

No additive is added, and other conditions are the same as the first comparative embodiment. The obtained cathodic bismuth metal is shown in FIG. 11A, the surface SEM image is shown in FIG. 11B, the cross-section SEM image is shown in FIG. 11C, and the XRD diagram is shown in FIG. 13.

Based on comparison, it can be seen that the surface of cathodic bismuth without additives is rough and easily separated from the cathodic plate (titanium plate). After adding the additives in the proportion, the morphology of the cathodic deposited bismuth is improved and the grain is slightly refined, but there is still a big gap with the bismuth metal prepared by the disclosure. The current efficiency, cell voltage and DC energy consumption in first to sixth comparative embodiments are shown in TBL. 1.

TABLE 1

| Comparative embodiments | Additive | Current efficiency (%) | Tank voltage (V) | Unit energy consumption/ (kW · h/t Bi) |
|---|---|---|---|---|
| first comparative embodiment | 1.0 g/L Bone gum | 96.05 | 1.88 | 753.08 |
| second comparative embodiment | 2.0 g/L Polyethylene glycol 600 | 97.15 | 1.71 | 677.23 |
| third comparative embodiment | 1.0 g/L Polypropylene glycol 400 | 97.77 | 1.73 | 680.82 |
| fourth comparative embodiment | 0.5 g/L Sodium lignosulfonate | 98.76 | 1.84 | 716.85 |
| fifth comparative embodiment | 1.0 g/L Sodium dodecyl sulfate | 99.15 | 1.70 | 659.74 |
| sixth comparative embodiment | 0 | 97.89 | 1.85 | 729.06 |

Each embodiment in this specification is described in a progressive manner and focuses on the differences from other embodiments. The same and similar parts of each embodiment can be referred to each other.

The above description of the disclosed embodiments enables those skilled in the art to realize or use the disclosure. Various modifications to these embodiments will be apparent to those skilled in the art, and the general principles defined herein can be implemented in other embodiments without departing from the spirit or scope of the disclosure. Therefore, the disclosure will not be limited to these embodiments shown herein, but will conform to the widest scope consistent with the principles and novel features disclosed herein.

What is claimed is:

1. A method for compact and flat bismuth metal preparation by electrolysis, comprising:
   1) preparing an acidic solution of bismuth methanesulfonate as an electrolyte, and adding an additive which is one or more selected from the group consisting of acacia, sulfonated and vulcanized alkylphenol ethoxy and naphthol ethoxy oxide to the electrolyte to obtain a mixed electrolyte consisting of the acidic solution of bismuth methanesulfonate and the additive; and
   2) injecting the mixed electrolyte obtained in step 1) into an electrolytic cell, inserting an anodic plate and a cathodic plate into the electrolytic cell, and applying direct current electrolysis to obtain compact and flat bismuth metal, wherein a concentration of the additive is in a range from 0.2 grams per liter (g/L) to 2.0 g/L.

2. The method for compact and flat bismuth metal preparation by electrolysis according to claim 1, wherein the acidic solution of bismuth methanesulfonate comprises bismuth methanesulfonate and free methanesulfonic acid, a concentration of the free methanesulfonic acid is in a range from 50 g/L to 100 g/L, and a concentration of bismuth ions of the electrolyte is in a range from 50 g/L to 120 g/L.

3. The method for compact and flat bismuth metal preparation by electrolysis according to claim 1, wherein the cathodic plate is a titanium plate, the anodic plate is a graphite plate, and a distance between the anodic plate and the cathodic plate is in a range from 3 centimeters (cm) to 5 cm.

4. The method for compact and flat bismuth metal preparation by electrolysis according to claim 1, wherein a temperature of the electrolyte is controlled to be in a range from 20 Celsius degrees (° C.) to 80° C. during electrolysis.

5. The method for compact and flat bismuth metal preparation by electrolysis according to claim 1, wherein a cathodic current density of the electrolysis is in a range from 60 amperes per square meter (A/m$^2$) to 300 A/m$^2$.

6. The method for compact and flat bismuth metal preparation by electrolysis according to claim 1, wherein a duration of the electrolysis is in a range from 4 hours (h) to 72 h.

7. The method for compact and flat bismuth metal preparation by electrolysis according to claim 1, wherein the electrolyte circulates in a way of down-in-up-out or up-in-down-out.

8. A method for compact and flat bismuth metal preparation by electrolysis, comprising:
   1) mixing bismuth methanesulfonate and free methanesulfonic acid to obtain an electrolyte, and adding sulfonated and vulcanized alkylphenol ethoxy and naphthol ethoxy oxide to the electrolyte to obtain a mixed electrolyte consisting of the bismuth methanesulfonate, the free methanesulfonic acid, the sulfonated and vulcanized alkylphenol ethoxy and the naphthol ethoxy oxide; and
   2) injecting the mixed electrolyte into an electrolytic cell, inserting an anodic plate and a cathodic plate into the electrolytic cell, and applying direct current electrolysis to obtain compact and flat bismuth metal.

* * * * *